US012521336B2

(12) United States Patent
Zhang et al.

(10) Patent No.: US 12,521,336 B2
(45) Date of Patent: Jan. 13, 2026

(54) ORAL CARE COMPOSITIONS

(71) Applicant: Colgate-Palmolive Company, New York, NY (US)

(72) Inventors: Dennis Zhang, Piscataway, NJ (US); Luciana Rinaudi Marron, Somerset, NJ (US); Stacey Lavender, Chesterfield, NJ (US); Alice Ng, Livingston, NJ (US); Qichao Ruan, Hillsborough, NJ (US)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 17/869,215

(22) Filed: Jul. 20, 2022

(65) Prior Publication Data
US 2023/0038764 A1 Feb. 9, 2023

Related U.S. Application Data

(60) Provisional application No. 63/223,720, filed on Jul. 20, 2021.

(51) Int. Cl.
*A61K 8/73* (2006.01)
*A61K 8/24* (2006.01)
*A61Q 11/00* (2006.01)

(52) U.S. Cl.
CPC .............. *A61K 8/731* (2013.01); *A61K 8/24* (2013.01); *A61Q 11/00* (2013.01)

(58) Field of Classification Search
CPC . A61K 8/731; A61K 8/24; A61K 8/19; A61K 8/21; A61K 8/25; A61K 8/27; A61K 8/44; A61Q 11/00
See application file for complete search history.

(56) References Cited

U.S. PATENT DOCUMENTS

| | | | |
|---|---|---|---|
| 6,919,070 B1 | 7/2005 | Rudin et al. | |
| 9,433,569 B2 | 9/2016 | Gualandi | |
| 10,653,596 B2 | 5/2020 | Giniger | |
| 2010/0129298 A1* | 5/2010 | Sakuma | A61Q 11/00 424/57 |
| 2010/0330002 A1 | 12/2010 | Robinson et al. | |
| 2016/0228341 A1 | 8/2016 | Lucas et al. | |
| 2017/0143612 A1 | 5/2017 | Deisenroth et al. | |
| 2017/0157171 A1 | 6/2017 | Gerard et al. | |
| 2018/0280263 A1 | 10/2018 | Rege et al. | |
| 2018/0338892 A1* | 11/2018 | Budde | A61K 8/21 |
| 2019/0380929 A1 | 12/2019 | Sarikaya et al. | |
| 2021/0007948 A1 | 1/2021 | Baig et al. | |
| 2023/0039655 A1 | 2/2023 | Zhang et al. | |
| 2023/0042124 A1 | 2/2023 | Ruan et al. | |
| 2023/0045410 A1 | 2/2023 | Zhang et al. | |

FOREIGN PATENT DOCUMENTS

| | | | |
|---|---|---|---|
| CN | 104490624 | 4/2015 | |
| CN | 109745235 | 5/2019 | |
| EP | 0344832 | 10/1992 | |
| WO | 2010/060816 | 6/2010 | |
| WO | WO-2010060816 A2 * | 6/2010 | ............... A61K 8/19 |
| WO | 2017/223497 | 12/2017 | |

OTHER PUBLICATIONS

Amaechi, B T, S M Higham, and W M Edgar. "The Influence of Xylitol and fluoride on Dental Erosion in Vitro." Archives of Oral Biology, 1998, 5.
Anonymous, 2017, "Caries Prophylaxis Mouthwash", Mintel Database GNPD AN: 4855451.
Anonymous, 2018, "Berry Cocktail Flavoured Natural Toothpaste for Kids", Mintel Database GNPD AN: 5983327.
Anonymous, 2018, "Biocare Toothpaste", Mintel Database GNPD AN: 5669395.
Anonymous, 2018, "Toothpaste with Dispenser", Mintel Database GNPD AN: 5913975.
Anonymous, 2020, "Propolish Toothpaste", Mintel Database GNPD AN: 7941699.
Anonymous, 2021, "Professional Toothpastes Set", Mintel Database GNPD AN: 8447347.
Anonymous, 2021, "Tooth Protection Gel with bioHAP", Mintel Database GNPD AN: 9026546.
Anonymous, 2022, "Medicinal Toothpaste", Mintel Database GNPD AN: 9396316.
Bajaj et al., "Fracture processes and mechanisms of crack growth resistance in human enamel", JOM (2010), 62, 76-82.
Cuy, J.L., A.B. Mann, K.J. Livi, M.F. Teaford, and T.P. Weihs. "Nanoindentation Mapping of the Mechanical Properties of Human Molar Tooth Enamel." Archives of Oral Biology 47, No. 4 (Apr. 2002): 281-91.
Elfallah et al., 2015, "Effect of tooth bleaching agents on protein content and mechanical properties of dental enamel", Acta Biomaterialia, 20:120-128.
International Search Report and the Written Opinion of the International Searching Authority issued in International Application PCT/US2022/037689 mailed Nov. 14, 2022.
International Search Report and the Written Opinion of the International Searching Authority issued in International Application PCT/US2022/037691 mailed Nov. 23, 2022.
International Search Report and the Written Opinion of the International Searching Authority issued in International Application PCT/US2022/037692 mailed Nov. 2, 2022.
International Search Report and the Written Opinion of the International Searching Authority issued in International Application PCT/US2022/037703 mailed Nov. 10, 2022.
Khoroushi et al., 2016, "Fracture toughness of bleached enamel: Effect of applying three different nanobiomaterials by nanoindentation test", Contemporary Clinical Dentistry, 7(2):209-215.

(Continued)

*Primary Examiner* — Marianne C Seidel
*Assistant Examiner* — Amanda Michelle Petritsch

(57) ABSTRACT

Disclosed herein are oral care compositions comprising hydroxyapatite and hydroxyethylcellulose as well as methods of reducing or inhibiting enamel erosion, repairing enamel erosion damage, and/or increasing enamel microcrack resistance using these compositions.

15 Claims, No Drawings

(56) References Cited

OTHER PUBLICATIONS

Park et al., "On the brittleness of enamel and selected dental materials", Dental Materials (2008), 24(11):1477-1485.
Ruan, Qichao, and Janet Moradian-Oldak. "Amelogenin and Enamel Biomimetics." Journal of Materials Chemistry B 3, No. 16 (2015): 3112-29.
Yu et al., 2016, "Investigation on the remineralization effect of arginine toothpaste for early enamel caries: nanotribological and nanomechanical properties", Journal of Physics D: Applied Physics,49:435401.
English Translation of CN104490624.
Roberts, A. J. "Role of models in assessing new agents for caries prevention—non-fluoride systems." Advances in Dental Research 9.3 (1995): 304-311. (Year: 1995).

\* cited by examiner

ORAL CARE COMPOSITIONS

CROSS-REFERENCE TO RELATED APPLICATIONS

This application claims the benefit of priority to U.S. Provisional Patent Application Ser. No. 63/223,720, filed Jul. 20, 2021 the contents of which are incorporated herein by reference in its entirety.

BACKGROUND

Dental enamel is a thin, hard layer of calcified material that covers the crown of teeth. Dental enamel is the first line of defense for tooth protection against acid and physical challenges. The major mineral component of dental enamel is hydroxyapatite, a crystalline form of calcium phosphate. Dental enamel is formed by 7 hierarchical layers of hydroxyapatite microstructures. The hierarchical organization of hydroxyapatite crystals enable the robust mechanical properties of enamel. Mature enamel does not contain cells and thus cannot regenerate unlike other biomaterials such as bone and dentine.

Dental erosion occurs initially in the enamel and, if unchecked, may proceed to the underlying dentin. Dental erosion may be caused or exacerbated by acidic foods and drinks, and stomach acids arising from gastric reflux. The tooth enamel surface is negatively charged, which naturally tends to attract positively charged ions such as calcium ions. Depending upon the relative pH of surrounding saliva, the tooth enamel will lose or gain positively charged ions such as calcium ions. Generally, saliva has a pH between 6.7 to 7.4. When the pH is lowered and concentration of hydrogen ions becomes relatively high, it damages the enamel and creates a porous, sponge-like roughened surface. The erosion of dental enamel can lead to enhanced tooth sensitivity due to increased exposure of the dentin tubules and increased dentin visibility leading to the appearance of more yellow teeth. In addition, when enamel erodes, the tooth is more susceptible to cavities or tooth decay.

Early acid damage on enamel is reversible by remineralization, in which mineral ions from saliva are reintroduced into the demineralized enamel. It has been reported that hydroxyapatite possesses a remineralizing effect on teeth and can be used to reduce tooth sensitivity.

Enamel micro cracks (EMC) are described as incomplete fractures of the enamel without loss of tooth structure. They are also referred to as craze lines, enamel infractions, or hairline fractures with the order of microns in size. Although prevalence has not clearly been reported, enamel microcrack has been reported as "very common", occurring more frequently with aging.

The formation of enamel micro cracks could be caused by many external factors such as the temperature variations, traumas, and the physical insults from repeated loading (grinding) and some dental procedures. Another important intrinsic factor for the EMC formation is the chemical and physical changes of enamel with the ages. Studies have demonstrated that the enamel of primary teeth is more elastic and softer when compared to the enamel in adult teeth. In addition, the outer enamel of younger adult teeth shows lower fracture toughness and brittleness than the ones with senior adults. In other words, senior teeth are more brittle and susceptible to enamel damage and cracking along the surface of the enamel. In the field of endodontics there are five different types of longitudinal cracks that can be described, craze lines, fractured cusp, split tooth, cracked tooth, and vertical root fractures. Craze lines or enamel micro cracks only affect the enamel, while the other type of cracks can affect enamel, dentin and possibly the pulp.

Although the enamel micro cracks or craze lines have been reported as "very common", they are not the major concerns for dentists, especially in comparison to other potential cracks that can occur to the tooth. If it's asymptomatic, there is typically no treatment provided. However, our studies have suggested that the enamel microcracks could be associated with more problems, such as the visually unappealing and the potential to weaken enamel. For example, the microcracks in the enamel allow extrinsic stains to diffuse and accumulate resulting in more staining on the enamel surface. In addition, enamel is softer at the microcrack region. This can cause local areas of increased or deeper demineralization weakening the mechanical properties of enamel. Furthermore, when enamel is exposed to acid, the microcracks become wider and more damages are observed with microcracks.

Enamel microscratch is one form of early enamel damage that cannot be seen by naked eyes. Microscratch occurs where the teeth start to lose enamel irreversibly due to the external mechanical actions. Continuous scratching will lead to a tooth abrasion which has been widely observed clinically, especially at the cervical and occlusal surfaces. The prevalence studies have indicated that tooth wear including abrasion is an increasing problem, especially in the elderly, as it is more common in this age group. An investigation found that 42% of the 20-to-29-year age group associated with abrasions, while the 40-to-49-year age group exhibited 76% with abrasions. See Litonjua LA, *Andreana* S, Bush PJ, Cohen RE. Tooth wear: attrition, erosion, and abrasion. Quintessence Int. 2003 June; 34(6):435-46. Another study has reported that the percentage of adults presenting with severe tooth wear increases from 3% at the age of 20 years to 17% at the age of 70 years. See Van't Spijker A, Rodriguez J M, Kreulen C M, Bronkhorst E M, Bartlett D W, Creugers N H. Prevalence of tooth wear in adults. Int J Prosthodont. 2009 January-February; 22(1):35-42. Clearly increasing levels of tooth wear is significantly associated with age.

Therefore, there is a need for oral care compositions that provide improved enamel protection, remineralization and/or or increase enamel microcrack and/or microscratch resistance.

BRIEF SUMMARY

In one aspect, the invention provides an oral care composition comprising hydroxyapatite (HAP) and hydroxyethylcellulose (HEC). In some embodiments, the hydroxyapatite is present in an amount of from 1% to 10% by weight of the composition. In some embodiments, the hydroxyapatite is present in an amount of from 2% to 10%, from 3% to 10%, from 4% to 10%, from 5% to 10%, from 4% to 9%, 5% to 9%, from 4% to 8%, from 5% to 8%, about 5%, or about 8%, by weight of the composition. In some embodiments, the hydroxyethylcellulose is present in an amount of from 0.1% to 5% by weight of the composition. In some embodiments, the hydroxyethylcellulose is present in an amount of from 1% to 5%, from 1% to 4%, from 2% to 5%, from 2% to 4%, from 3% to 5%, from 3.5% to 5%, from 4% to 5%, from 3.5% to 4.5%, or about 4%, by weight of the composition. In some embodiments, the composition is a toothpaste, gel, serum, mouth spray, or mouthwash.

In another aspect, the invention provides a method of reducing or inhibiting enamel erosion, repairing enamel erosion damage, and/or increasing enamel microcrack resistance, comprising applying an oral care composition comprising hydroxyapatite (HAP) and hydroxyethylcellulose (HEC) to the oral cavity. In some embodiments, the hydroxyapatite is present in an amount of from 1% to 10% by weight of the composition. In some embodiments, the hydroxyapatite is present in an amount of from 2% to 10%, from 3% to 10%, from 4% to 10%, from 5% to 10%, from 4% to 9%, 5% to 9%, from 4% to 8%, from 5% to 8%, about 5%, or about 8%, by weight of the composition. In some embodiments, the hydroxyethylcellulose is present in an amount of from 0.1% to 5% by weight of the composition. In some embodiments, the hydroxyethylcellulose is present in an amount of from 1% to 5%, from 1% to 4%, from 2% to 5%, from 2% to 4%, from 3% to 5%, from 3.5% to 5%, from 4% to 5%, from 3.5% to 4.5%, or about 4%, by weight of the composition. In some embodiments, the composition is a toothpaste, gel, serum, mouth spray, or mouthwash. In some embodiments, the method increases enamel microcrack resistance, optionally wherein the enamel microcrack resistance efficacy of the composition is determined by one or more parameters selected from change in crack length, change in fracture toughness, change in brittleness and a combination thereof, i.e., wherein the method decreases crack length, increases fracture toughness, decreases brittleness, and a combination thereof.

In another aspect, the invention provides the use of hydroxyapatite (HAP) and hydroxyethylcellulose (HEC) for the making of an oral care composition for reducing or inhibiting enamel erosion, repairing enamel erosion damage, and/or increasing enamel microcrack resistance.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

DETAILED DESCRIPTION

The following description of the preferred embodiment(s) is merely exemplary in nature and is in no way intended to limit the disclosure, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The invention provides, in an aspect, an oral care composition (Composition 1.0), e.g., toothpaste or gel, which comprises hydroxyapatite (HAP) and hydroxyethylcellulose (HEC). In one aspect, and without being bound theory, it is believed to be reasonable to consider the enamel microscratch is an early sign of tooth aging. In one aspect, the compositions and methods described herein can be used to increase the resistance to enamel microcrack and/or enamel microscratches.

For example, the invention includes:
1.1. Composition 1.0, wherein the hydroxyapatite is present in an amount of from 1% to 10% by weight of the composition.
1.2. Any of the preceding compositions, wherein the hydroxyapatite is present in an amount of from 2% to 10%, from 3% to 10%, from 4% to 10%, from 5% to 10%, from 4% to 9%, 5% to 9%, from 4% to 8%, from 5% to 8%, about 5%, or about 8%, by weight of the composition, optionally wherein the hydroxyapatite is present in an amount of about 5% or about 8% by weight of the composition.
1.3. Any of the preceding compositions, wherein the hydroxyapatite is a micro-hydroxyapatite (m-HAP), optionally wherein the micro-hydroxyapatite has a mean diameter of greater than 1 μm, e.g., 1 to 100 μm or 5 to 100 μm.
1.4. Any of the preceding compositions, wherein the hydroxyapatite is a nano-hydroxyapatite (n-HAP), optionally wherein the nano-hydroxyapatite has a mean diameter of less than 1000 nm, e.g., 1 to 1000 nm, 50 to 1000 nm, 10 nm to 100 nm, 100 nm to 1000 nm.
1.5. Any of the preceding compositions, wherein the hydroxyapatite is a functionalized hydroxyapatite, e.g., HAP $CaCO_3$, $ZnCO_3$-hydroxyapatite, or HAP/TCP (tricalcium phosphate).
1.6. Any of the preceding compositions, wherein the hydroxyethylcellulose is present in an amount of from 0.1% to 5% by weight of the composition.
1.7. Any of the preceding compositions, wherein the hydroxyethylcellulose is present in an amount of from 1% to 5%, from 1% to 4%, from 2% to 5%, from 2% to 4%, from 3% to 5%, from 3.5% to 5%, from 4% to 5%, from 3.5% to 4.5%, or about 4%, by weight of the composition, optionally wherein the hydroxyethylcellulose is present in an amount of about 4% by weight of the composition.
1.8. Any of the preceding compositions, wherein the composition does not contain any thickening agent other than hydroxyethylcellulose.
1.9. Any of Compositions 1.0-1.7, wherein the composition contains additional thickening agents other than hydroxyethylcellulose, optionally wherein the additional thickening agents are selected from colloidal silica, fumed silica, cross-linked polyvinylpyrrolidone (PVP), carboxymethylcellulose, carrageenan, karaya, xanthan, gum arabic, tragacanth, and a combination thereof, further optionally wherein the additional thickening agents are selected from carboxymethylcellulose, carrageenan, xanthan, and a combination thereof
1.10. Any of the preceding compositions, wherein the composition comprises a basic amino acid.
1.11. Any of the preceding compositions, wherein the basic amino acid comprises one or more of arginine, lysine, citrulline, ornithine, creatine, histidine, diaminobutyric acid, diaminopropionic acid, salts thereof, or combinations thereof.
1.12. Any of the preceding compositions, wherein the basic amino acid has the L-configuration.
1.13. Any of the preceding compositions, wherein the basic amino acid is present in an amount of from 1% to 15%, e.g., from 1% to 10%, from 2% to 8%, from 3% to 7%, from 4% to 6%, or about 5% by weight of the composition, being calculated as free base form.
1.14. Any of the preceding compositions, wherein the basic amino acid comprises arginine.
1.15. Any of the preceding compositions, wherein the basic amino acid comprises L-arginine.

1.16. Any of the preceding compositions, wherein the basic amino acid comprises arginine bicarbonate, arginine phosphate, arginine sulfate, arginine hydrochloride or combinations thereof, optionally wherein the basic amino acid is arginine bicarbonate.
1.17. Any of the preceding compositions, wherein the composition comprises a zinc ion source.
1.18. Any of the preceding compositions, wherein the zinc ion source is selected from the group consisting of zinc oxide, zinc sulfate, zinc chloride, zinc citrate, zinc lactate, zinc gluconate, zinc malate, zinc tartrate, zinc carbonate, zinc phosphate and a combination thereof.
1.19. Any of the preceding compositions, wherein the zinc ion source is present an amount of from 0.01% to 5%, e.g., 0.1% to 4%, or 0.5% to 3%, by weight of the composition.
1.20. Any of the preceding compositions, wherein the zinc ion source is selected from the group consisting of zinc oxide, zinc citrate, and a combination thereof, optionally wherein the zinc ion source is a combination of zinc oxide and zinc citrate.
1.21. Any of the preceding compositions, wherein zinc oxide is present in an amount of 0.5% to 2%, e.g., 0.5% to 1.5%, or about 1% by weight of the composition.
1.22. Any of the preceding compositions, wherein zinc citrate is present in an amount of 0.1% to 2.5%, 0.1% to 2%, 0.1% to 1%, 0.25 to 0.75%, 1.5% to 2.5%, about 2%, or about 0.5% by weight of the composition.
1.23. Any of the preceding compositions, wherein the composition comprises a fluoride ion source.
1.24. Any of the preceding compositions, wherein the fluoride ion source is selected from sodium fluoride, stannous fluoride, potassium fluoride, sodium monofluorophosphate, sodium fluorosilicate, ammonium fluorosilicate, amine fluoride (e.g., N'-octadecyltrimethylenediamine-N,N,N'-tris(2-ethanol)-dihydrofluoride), ammonium fluoride, titanium fluoride, hexafluorosulfate, and a combination thereof
1.25. Any of the preceding compositions, wherein the fluoride ion source is present in an amount sufficient to supply 25 ppm to 5,000 ppm of fluoride ions, generally at least 500 ppm, e.g., 500 to 2000 ppm, e.g., 1000 ppm to 1600 ppm, e.g., 1450 ppm.
1.26. Any of the preceding compositions, wherein the fluoride ion source is sodium fluoride.
1.27. Any of the preceding compositions, wherein the composition comprises a potassium ion source.
1.28. Any of the preceding compositions, wherein the potassium ion source is selected from the group consisting of potassium citrate, potassium tartrate, potassium chloride, potassium sulfate, potassium nitrate and a combination thereof.
1.29. Any of the preceding compositions, wherein the potassium ion source is present in an amount of from 0.1% to 5.5%, e.g., from 0.1% to 4%, or from 0.5% to 3%, by weight of the composition.
1.30. Any of the preceding compositions, wherein the abrasive is selected from silica abrasives, calcium phosphate abrasives, e.g., tricalcium phosphate ($Ca_3(PO_4)_2$), or dicalcium phosphate dihydrate ($CaHPO_4 \cdot 2H_2O$) or calcium pyrophosphate; calcium carbonate abrasive; or abrasives such as sodium metaphosphate, potassium metaphosphate, aluminum silicate, calcined alumina, bentonite or other siliceous materials, and combinations thereof.
1.31. Any of the preceding compositions, wherein the abrasive is present in an amount of from 10% to 70%, e.g., from 10% to 30%, e.g., 10% to 20%, 15% to 25%, from 20% to 50%, from 25% to 45%, or from 30% to 40% by weight of the composition.
1.32. Any of the preceding compositions, wherein the abrasive comprises a silica abrasive.
1.33. Any of the preceding compositions, wherein the silica abrasive is present in an amount of from 10% to 30%, e.g., 10% to 20%, 15% to 25%, or about 16%, by weight of the composition.
1.34. Any of the preceding compositions, wherein the abrasive comprises a calcium-containing abrasive, optionally wherein the calcium-containing abrasive is selected from calcium carbonate, calcium phosphate (e.g., dicalcium phosphate dihydrate), calcium sulfate, and combinations thereof.
1.35. Any of the preceding compositions, wherein the abrasive comprises calcium carbonate, optionally wherein the calcium carbonate comprises precipitated calcium carbonate.
1.36. Any of the preceding compositions, wherein the abrasive comprises calcium phosphate (e.g., dicalcium phosphate dihydrate).
1.37. Any of the preceding compositions, wherein the composition comprises a humectant, optionally wherein the humectant is selected from sorbitol, glycerin and a mixture thereof.
1.38. Any of the preceding compositions, wherein the humectant comprises glycerin, optionally wherein glycerin is present in an amount of from 10% to 40%, from 15% to 30%, from 15% to 25%, or about 20% by weight of the composition.
1.39. Any of the preceding compositions, wherein the humectant comprises sorbitol, optionally wherein sorbitol is present in an amount of from 10% to 40%, from 15% to 30%, from 15% to 25%, or about 20% by weight of the composition.
1.40. Any of the preceding compositions, wherein the composition comprises one or more soluble phosphate salts, e.g., selected from tetrasodium pyrophosphate (TSPP), sodium tripolyphosphate (STPP) and a combination thereof.
1.41. Any of the preceding compositions, wherein the composition comprises water, optionally wherein water is present in an amount of from 10% to 80%, from 20% to 60%, from 20% to 40%, from 10% to 30%, from 20% to 30% or from 25% to 35% by weight of the composition.
1.42. Any of the preceding compositions wherein composition comprises a surfactant, e.g., selected from anionic, cationic, zwitterionic, and nonionic surfactants, and mixtures thereof.
1.43. Any of the preceding compositions, wherein the composition comprises an anionic surfactant, e.g., a surfactant selected from sodium lauryl sulfate, sodium ether lauryl sulfate, and mixtures thereof, e.g., in an amount of from about 0.3% to about 4.5% by weight, e.g., 1-2% sodium lauryl sulfate (SLS) by weight of the composition.
1.44. Any of the preceding compositions, wherein the composition comprises a zwitterionic surfactant, for example a betaine surfactant, for example cocamidopropyl betaine, e.g., in an amount of 0.1%-4.5% by weight, e.g., 0.5-2% cocamidopropyl betaine by weight of the composition.

1.45. Any of the preceding compositions, wherein the composition comprises a nonionic surfactant, e.g., a poly(propylene oxide)/poly(ethylene oxide) copolymer.

1.46. Any of the preceding compositions, wherein the composition comprises hydroxyapatite (HAP) in an amount of from 4% to 9% by weight of the composition and hydroxyethylcellulose (HEC) in an amount of from 3% to 5% by weight of the composition.

1.47. Any of the preceding compositions, wherein the composition comprises hydroxyapatite (HAP) in an amount of from 5% to 8% by weight of the composition and hydroxyethylcellulose (HEC) in an amount of from 3.5% to 4.5% by weight of the composition.

1.48. Any of the preceding compositions, wherein the composition comprises hydroxyapatite (HAP) in an amount of about 5% by weight of the composition and hydroxyethylcellulose (HEC) in an amount of about 4% by weight of the composition.

1.49. Any of the preceding compositions, wherein the composition comprises hydroxyapatite (HAP) in an amount of about 8% by weight of the composition and hydroxyethylcellulose (HEC) in an amount of about 4% by weight of the composition.

1.50. Any of the preceding compositions, wherein the composition is a toothpaste, gel, serum, mouth spray, or mouthwash.

1.51. Any of the preceding compositions, wherein the composition is a toothpaste or gel.

1.52. Any of the preceding compositions, wherein the composition is a toothpaste.

1.53. Any of the preceding compositions, wherein the composition is a gel.

1.54. Any of the preceding compositions for use in reducing or inhibiting enamel erosion, repairing enamel erosion damage, increasing enamel microcrack and/or microcscratch resistance.

1.55. Any of the preceding compositions for use in increasing enamel microcrack resistance, optionally wherein the increase of microcrack resistance is determined by decreasing crack length, increasing fracture toughness, decreasing brittleness, and a combination thereof.

1.56. Any of the preceding compositions for use in increasing enamel microscratch resistance, optionally wherein the increase of microscratch resistance is determined by decreasing scratch depth, volume, width, and a combination thereof 1.57. Any of the preceding compositions, wherein the oral care composition is in the form selected from the group consisting of: a dentifrice (e.g., toothpaste), tooth powder, a gel, chewing gum, mousse, tablet, lozenge, mouthwash, varnish, and spray, The invention provides, in another aspect, a method (Method 2.0) of reducing or inhibiting enamel erosion, repairing enamel erosion damage, increasing enamel microcrack resistance and/or increasing enamel microscratch resistance, comprising applying an oral care composition comprising hydroxyapatite (HAP) and hydroxyethylcellulose (HEC) to the oral cavity.

For example, the invention includes:

2.1. Method 2.0, wherein the hydroxyapatite is present in an amount of from 1% to 10% by weight of the composition.

2.2. Any of the preceding methods, wherein the hydroxyapatite is present in an amount of from 2% to 10%, from 3% to 10%, from 4% to 10%, from 5% to 10%, from 4% to 9%, 5% to 9%, from 4% to 8%, from 5% to 8%, about 5%, or about 8%, by weight of the composition, optionally wherein the hydroxyapatite is present in an amount of about 5% or about 8% by weight of the composition.

2.3. Any of the preceding compositions, wherein the hydroxyapatite is a micro-hydroxyapatite (m-HAP), optionally wherein the micro-hydroxyapatite has a mean diameter of greater than 1 μm, e.g., 1 to 100 μm or 5 to 100

2.4. Any of the preceding compositions, wherein the hydroxyapatite is a nano-hydroxyapatite (n-HAP), optionally wherein the nano-hydroxyapatite has a mean diameter of less than 1000 nm, e.g., 1 to 1000 nm, 50 to 1000 nm, 10 nm to 100 nm, 100 nm to 1000 nm.

2.5. Any of the preceding methods, wherein the hydroxyapatite is a functionalized hydroxyapatite, e.g., HAP $CaCO_3$, $ZnCO_3$-hydroxyapatite, or HAP/TCP (tricalcium phosphate).

2.6. Any of the preceding methods, wherein the hydroxyethylcellulose is present in an amount of from 0.1% to 5% by weight of the composition.

2.7. Any of the preceding methods, wherein the hydroxyethylcellulose is present in an amount of from 1% to 5%, from 1% to 4%, from 2% to 5%, from 2% to 4%, from 3% to 5%, from 3.5% to 5%, from 4% to 5%, from 3.5% to 4.5%, or about 4%, by weight of the composition, optionally wherein the hydroxyethylcellulose is present in an amount of about 4% by weight of the composition.

2.8. Any of the preceding methods, wherein the composition does not contain any thickening agent other than hydroxyethylcellulose.

2.9. Any of Methods 2.0-2.7, wherein the composition contains additional thickening agents other than hydroxyethylcellulose, optionally wherein the additional thickening agents are selected from colloidal silica, fumed silica, cross-linked polyvinylpyrrolidone (PVP), carboxymethylcellulose, carrageenan, karaya, xanthan, gum arabic, tragacanth, and a combination thereof, further optionally wherein the additional thickening agents are selected from carboxymethylcellulose, carrageenan, xanthan, and a combination thereof.

2.10. Any of the preceding methods, wherein the composition comprises a basic amino acid.

2.11. Any of the preceding methods, wherein the basic amino acid comprises one or more of arginine, lysine, citrulline, ornithine, creatine, histidine, diaminobutyric acid, diaminopropionic acid, salts thereof, or combinations thereof.

2.12. Any of the preceding methods, wherein the basic amino acid has the L-configuration.

2.13. Any of the preceding methods, wherein the basic amino acid is present in an amount of from 1% to 15%, e.g., from 1% to 10%, from 2% to 8%, from 3% to 7%, from 4% to 6%, or about 5% by weight of the composition, being calculated as free base form.

2.14. Any of the preceding methods, wherein the basic amino acid comprises arginine.

2.15. Any of the preceding methods, wherein the basic amino acid comprises L-arginine.

2.16. Any of the preceding compositions, wherein the basic amino acid comprises arginine bicarbonate, arginine phosphate, arginine sulfate, arginine hydrochloride or combinations thereof, optionally wherein the basic amino acid is arginine bicarbonate.

2.17. Any of the preceding methods, wherein the composition comprises a zinc ion source.
2.18. Any of the preceding compositions, wherein the zinc ion source is selected from the group consisting of zinc oxide, zinc sulfate, zinc chloride, zinc citrate, zinc lactate, zinc gluconate, zinc malate, zinc tartrate, zinc carbonate, zinc phosphate and a combination thereof.
2.19. Any of the preceding methods, wherein the zinc ion source is present an amount of from 0.01% to 5%, e.g., 0.1% to 4%, or 0.5% to 3%, by weight of the composition.
2.20. Any of the preceding compositions, wherein the zinc ion source is selected from the group consisting of zinc oxide, zinc citrate, and a combination thereof, optionally wherein the zinc ion source is a combination of zinc oxide and zinc citrate.
2.21. Any of the preceding methods, wherein zinc oxide is present in an amount of 0.5% to 2%, e.g., 0.5% to 1.5%, or about 1% by weight of the composition.
2.22. Any of the preceding methods, wherein zinc citrate is present in an amount of 0.1% to 2.5%, 0.1% to 2%, 0.1% to 1%, 0.25 to 0.75%, 1.5% to 2.5%, about 2%, or about 0.5% by weight of the composition.
2.23. Any of the preceding methods, wherein the composition comprises a fluoride ion source.
2.24. Any of the preceding methods, wherein the fluoride ion source is selected from sodium fluoride, stannous fluoride, potassium fluoride, sodium monofluorophosphate, sodium fluorosilicate, ammonium fluorosilicate, amine fluoride (e.g., N'-octadecyltrimethylenediamine-N,N,N'-tris(2-ethanol)-dihydrofluoride), ammonium fluoride, titanium fluoride, hexafluorosulfate, and a combination thereof.
2.25. Any of the preceding methods, wherein the fluoride ion source is present in an amount sufficient to supply 25 ppm to 5,000 ppm of fluoride ions, generally at least 500 ppm, e.g., 500 to 2000 ppm, e.g., 1000 ppm to 1600 ppm, e.g., 1450 ppm.
2.26. Any of the preceding methods, wherein the fluoride ion source is sodium fluoride.
2.27. Any of the preceding methods, wherein the composition comprises a potassium ion source.
2.28. Any of the preceding methods, wherein the potassium ion source is selected from the group consisting of potassium citrate, potassium tartrate, potassium chloride, potassium sulfate, potassium nitrate and a combination thereof.
2.29. Any of the preceding methods, wherein the potassium ion source is present in an amount of from 0.1% to 5.5%, e.g., from 0.1% to 4%, or from 0.5% to 3%, by weight of the composition.
2.30. Any of the preceding methods, wherein the composition comprises an abrasive.
2.31. Any of the preceding methods, wherein the abrasive is selected from silica abrasives, calcium phosphate abrasives, e.g., tricalcium phosphate ($Ca_3(PO_4)_2$), or dicalcium phosphate dihydrate ($CaHPO_4 \cdot 2H_2O$) or calcium pyrophosphate; calcium carbonate abrasive; or abrasives such as sodium metaphosphate, potassium metaphosphate, aluminum silicate, calcined alumina, bentonite or other siliceous materials, and combinations thereof
2.32. Any of the preceding methods, wherein the abrasive is present in an amount of from 10% to 70%, e.g., from 10% to 30%, e.g., 10% to 20%, 15% to 25%, from 20% to 50%, from 25% to 45%, or from 30% to 40% by weight of the composition.
2.33. Any of the preceding methods, wherein the abrasive comprises a silica abrasive.
2.34. Any of the preceding compositions, wherein the silica abrasive is present in an amount of from 10% to 30%, e.g., 10% to 20%, 15% to 25%, or about 16%, by weight of the composition.
2.35. Any of the preceding methods, wherein the abrasive comprises a calcium-containing abrasive, optionally wherein the calcium-containing abrasive is selected from calcium carbonate, calcium phosphate (e.g., dicalcium phosphate dihydrate), calcium sulfate, and combinations thereof
2.36. Any of the preceding methods, wherein the abrasive comprises calcium carbonate, optionally wherein the calcium carbonate comprises precipitated calcium carbonate.
2.37. Any of the preceding methods, wherein the abrasive comprises calcium phosphate (e.g., dicalcium phosphate dihydrate).
2.38. Any of the preceding methods, wherein the composition comprises a humectant, optionally wherein the humectant is selected from sorbitol, glycerin and a mixture thereof
2.39. Any of the preceding methods, wherein the humectant comprises glycerin, optionally wherein glycerin is present in an amount of from 10% to 40%, from 15% to 30%, from 15% to 25%, or about 20% by weight of the composition.
2.40. Any of the preceding methods, wherein the humectant comprises sorbitol, optionally wherein sorbitol is present in an amount of from 10% to 40%, from 15% to 30%, from 15% to 25%, or about 20% by weight of the composition.
2.41. Any of the preceding methods, wherein the composition comprises one or more soluble phosphate salts, e.g., selected from tetrasodium pyrophosphate (TSPP), sodium tripolyphosphate (STPP) and a combination thereof.
2.42. Any of the preceding methods, wherein the composition comprises water, optionally wherein water is present in an amount of from 10% to 80%, from 20% to 60%, from 20% to 40%, from 10% to 30%, from 20% to 30% or from 25% to 35% by weight of the composition.
2.43. Any of the preceding methods, wherein composition comprises a surfactant, e.g., selected from anionic, cationic, zwitterionic, and nonionic surfactants, and mixtures thereof.
2.44. Any of the preceding methods, wherein the composition comprises an anionic surfactant, e.g., a surfactant selected from sodium lauryl sulfate, sodium ether lauryl sulfate, and mixtures thereof, e.g., in an amount of from about 0.3% to about 4.5% by weight, e.g., 1-2% sodium lauryl sulfate (SLS) by weight of the composition.
2.45. Any of the preceding methods, wherein the composition comprises a zwitterionic surfactant, for example a betaine surfactant, for example cocamidopropyl betaine, e.g., in an amount of 0.1%-4.5% by weight, e.g., 0.5-2% cocamidopropyl betaine by weight of the composition.
2.46. Any of the preceding methods, wherein the composition comprises a nonionic surfactant, e.g., a poly (propylene oxide)/poly(ethylene oxide) copolymer.
2.47. Any of the preceding methods, wherein the composition comprises hydroxyapatite (HAP) in an amount of from 4% to 9% and hydroxyethylcellulose (HEC) in an amount of from 3% to 5% by weight of the composition.

2.48. Any of the preceding methods, wherein the composition comprises hydroxyapatite (HAP) in an amount of from 5% to 8% and hydroxyethylcellulose (HEC) in an amount of from 3.5% to 4.5% by weight of the composition. Any of the preceding compositions, wherein the composition comprises hydroxyapatite (HAP) in an amount of about 5% by weight of the composition and hydroxyethylcellulose (HEC) in an amount of about 4% by weight of the composition.

2.49. Any of the preceding compositions, wherein the composition comprises hydroxyapatite (HAP) in an amount of about 8% by weight of the composition and hydroxyethylcellulose (HEC) in an amount of about 4% by weight of the composition.

2.50. Any of the preceding methods, wherein the composition is a toothpaste, gel, serum, mouth spray, or mouthwash.

2.51. Any of the preceding methods, wherein the composition is a toothpaste or gel.

2.52. Any of the preceding methods, wherein the composition is a toothpaste.

2.53. Any of the preceding methods, wherein the composition is a gel.

2.54. Any of the preceding methods, wherein the method increases enamel microcrack resistance.

2.55. Any of the preceding methods, wherein the method increases enamel microscratch resistance 2.56. Any of the preceding methods, wherein the enamel microcrack resistance efficacy of the composition is determined by one or more parameters selected from change in crack length, change in fracture toughness, change in brittleness and a combination thereof, i.e., the method decreases crack length, increases fracture toughness, decreases brittleness, and a combination thereof.

2.57. Any of the preceding methods, wherein the enamel microscratch resistance efficacy of the composition is determined by one or more parameters selected from change in microscratch length, change in microscratch depth, change in microscratch width, change in surface fracture toughness, change in brittleness and a combination thereof, i.e., the method decreases microscratch length, decreases microscratch width, decreases microscratch depth, increases fracture toughness, decreases brittleness, and a combination thereof.

2.58. Any of the preceding methods, wherein the oral care composition is applied to the oral cavity of a subject who is at risk of enamel microcracks and/or enamel microscratches; alternatively, said subject has enamel microcracks and/or microscratches.

2.59. Any of the preceding methods, wherein the composition is applied to a tooth surface of a subject in need thereof (i.e., a subject suffering from or at risk for developing microcracks and/or microscratches in tooth enamel).

2.60. Any of the preceding methods, wherein the composition is applied to a tooth surface of a subject in need thereof (i.e., a subject suffering from or at risk for developing microscratches in tooth enamel).

2.61. Any of the preceding methods, wherein the subject has suffered a trauma or damage to one or more teeth.

2.62. Any of the preceding methods, wherein the subject is recovering from a dental procedure.

2.63. Any of the preceding methods, wherein the subject has endured physical insults from repeated loading (i.e., grinding) of the teeth.

2.64. Any of the preceding methods, wherein the subject has been subjected to repeated temperature fluctuations.

Thickeners are widely used in oral care formulations for structure building purpose. In the present invention, it has been found that not all the thickeners have the same impact on repairing erosive damaged enamel and that hydroxyethylcellulose (HEC) has superior effect on repairing erosive damaged enamel compared to other thickeners. It has also been found that the incorporation of hydroxyapatite (HAP) to the oral care composition containing HEC improves the acid protection properties of the composition.

In the present invention, it has also been found that the oral care composition containing HEC and HAP increases enamel microcrack resistance. As used herein, "enamel microcrack (EMC)" or "microcrack" or "microcracking" refers to incomplete fractures of the enamel without loss of tooth structure. They are also referred to as craze lines, enamel infractions, or hairline fractures with the order of microns in size. Enamel microcrack is common, occurring more frequently as people age. Unlike enamel damage or microdamage resulting from chemical or biological derived acid such as enamel erosion or caries, enamel microcracks are mainly caused by physical insults from mechanical processes. These physical insults can initiate from an applied force to the enamel. Because the initiation of these conditions is different, the enamel structure changes correlated with microcracks are not the same as the changes observed in the early stage of erosion or caries. For example, as a result of the demineralization process, loss of enamel crystals with corresponding compositional changes can be observed under acid challenges (enamel erosion), while the repeated physical insults may cause the fracture of enamel prismatic structures (microcracks) without changing the chemical composition. Therefore, the technology of treatments for these two types of micro damages is not the same.

The enamel microcrack resistance efficacy of an oral care composition can be determined by an in vitro enamel microcrack resistance model as described in Example 3. In this model, microcrack may be generated, e.g., using a micro-hardness tester with an indenter, e.g., a Vickers diamond indenter. The enamel microcrack resistance efficacy of an oral care composition may be determined by measuring one or more parameters selected from change in crack length, change in fracture toughness, change in brittleness and a combination thereof. The fracture toughness ($K_c$) is calculated according to $$Kc = 0.0084 \left(\frac{E}{HV}\right)^{\frac{2}{5}} \left(\frac{2F}{L}\right) \frac{1}{c^{\frac{1}{2}}}$$

where E, HV, F, L and c are the elastic modulus, Vickers hardness, indentation load, average indentation diagonal length and crack length, respectively.

The Vickers hardness (HV) for each indentation is calculated according to $$HV = \frac{0.1891F}{L^2}$$

where F is the indentation load and L the indentation diagonal.

The indentation brittleness (B) of enamel is calculated according to $$B = \frac{HV \times E}{K^2}$$

where E and HV are the elastic modulus and Vickers hardness, respectively.

In the present disclosure, it has also been found that the oral care composition containing a basic amino acid and HAP increases enamel microscratch resistance.

As used herein, "enamel microscratch" or "microscratches" refers to damage to the surface of the enamel, wherein the damage is usually caused by the sliding or rubbing of abrasive external objects against the tooth surfaces. For example, several factors are reported to cause such enamel damage, including the use of an abrasive toothpaste, hard bristles, a vigorous brushing technique and ill-fitting dental appliances like retainers and dentures. It may also be caused by the use of toothpicks and miswaks, as well as the consumption of abrasive foods, such as tobacco and sunflower seeds. Beside these, people with habits such as nail biting and lip or tongue piercing, are subjected to higher risks of enamel microscratch. Another factor that can cause enamel microscratch is the combination of mechanical and chemical corrosion. Specifically, an acid attack on the enamel could compromise its mechanical properties and make it more susceptible to scratches.

As used herein, "enamel microscratch" or "microscratches" refers to microscopic damage at the tooth surface, and it is difficult to be detected by naked eyes or the common tools used in clinics. However, if left untreated, the continuous scratching can cause a massive wear through the enamel (i.e. abrasion) and lead to severe consequences. It has been reported that the enamel loss due to abrasion may lead to symptoms such as increased tooth sensitivity to hot and cold, increased plaque trapping which will result in caries and periodontal disease. It may also be aesthetically unpleasant to some people. Microscratch could bring a rough and dull enamel surface, and could also allow extrinsic stains to accumulate resulting in more staining on the enamel surface.

The oral care composition may form at least a portion of or be used in one or more oral care products. The oral care composition may include or be combined with an orally acceptable vehicle to form the oral care product (e.g., toothpaste). Illustrative oral care products may include, but are not limited to, a toothpaste (dentifrice), a prophylactic paste, a tooth powder, a tooth polish, a tooth gel (e.g., whitening gel), a serum, a mouth spray, a chewing gum, a lozenge, a mouthwash, a whitening strip, a paint-on gel, varnish, veneer, and tube, syringe or dental tray comprising a gel or paste, or a gel or paste coated on an application support such as dental floss or a toothbrush (e.g., a manual, electric, sound, a combination thereof or ultrasound toothbrush). In a typical implementation, the oral care composition may form at least a portion of or be used with a toothpaste. For example, the oral care composition may typically be a gel of the toothpaste, or a whitening gel to be combined with the toothpaste. The oral care composition may include or be combined with an orally acceptable vehicle to form the oral care product. In some embodiments, the oral care composition is a toothpaste, gel, serum, mouth spray, or mouthwash. In some embodiments, the oral care composition is a toothpaste or gel. In certain embodiments, the oral care composition is a toothpaste. In other embodiments, the oral care composition is a gel. The oral care composition may be a single phase oral care composition. For example, all the components of the oral care composition may be maintained together with one another in a single phase and/or vessel. For example, all the components of the oral care composition may be maintained in a single phase, such as a single homogenous phase. In another embodiment, the oral care composition may be a multi-phase oral care composition.

As used herein, an "oral care composition" refers to a composition for which the intended use includes oral care, oral hygiene, and/or oral appearance, or for which the intended method of use comprises administration to the oral cavity, and refers to compositions that are palatable and safe for topical administration to the oral cavity, and for providing a benefit to the teeth and/or oral cavity. The term "oral care composition" thus specifically excludes compositions which are highly toxic, unpalatable, or otherwise unsuitable for administration to the oral cavity. In some embodiments, an oral care composition is not intentionally swallowed, but is rather retained in the oral cavity for a time sufficient to affect the intended utility. The oral care compositions as disclosed herein may be used in nonhuman mammals such as companion animals (e.g., dogs and cats), as well as by humans. In some embodiments, the oral care compositions as disclosed herein are used by humans. Oral care compositions include, for example, dentifrice and mouthwash.

The oral care composition of the invention may contain an orally acceptable carrier. As used herein, an "orally acceptable carrier" refers to a material or combination of materials that are safe for use in the compositions of the invention, commensurate with a reasonable benefit/risk ratio. Such materials include but are not limited to, for example, water, humectants, ionic active ingredients, buffering agents, anticalculus agents, abrasive polishing materials, peroxide sources, alkali metal bicarbonate salts, surfactants, titanium dioxide, coloring agents, flavor systems, sweetening agents, antimicrobial agents, herbal agents, desensitizing agents, stain reducing agents, and mixtures thereof. Such materials are well known in the art and are readily chosen by one skilled in the art based on the physical and aesthetic properties desired for the compositions being prepared. In some embodiment, the orally acceptable carrier may include an orally acceptable solvent. Illustrative solvents may include, but are not limited to, one or more of ethanol, phenoxyethanol, isopropanol, water, cyclohexane, methyl glycol acetate, benzyl alcohol, or the like, or any mixture or combination thereof. In a particular embodiment, the orally acceptable solvent includes benzyl alcohol.

Water may be present in the oral compositions of the invention. Water employed in the preparation of commercial oral compositions should be deionized and free of organic impurities. Water commonly makes up the balance of the compositions and includes about 10% to about 80%, about 20% to about 60%, about 20% to 40%, about 10% to about 30%, about 20% to 30%, or about 25% to 35% by weight of the oral compositions. This amount of water includes the free water which is added plus that amount which is introduced with other materials such as with sorbitol or any components of the invention.

The oral care composition of the invention comprises hydroxyapatite. Hydroxyapatite is a form of calcium phosphate having the chemical formula $Ca_5(PO_4)_3(OH)$, also usually written $Ca_{10}(PO_4)_6(OH)_2$ to denote that the crystal unit comprises two entities. Hydroxyapatite is the main component of tooth enamel and has a strong affinity to the tooth enamel surface. Hydroxyapatite can group together to form microscopic aggregates, called hydroxyapatite crystals. In some embodiments, the hydroxyapatite is micro-hydroxyapatite (m-HAP). In non-limiting examples, the micro-hydroxyapatites have a mean diameter of greater than 1 µm, e.g., 1 to 100 µm or 5 to 100 In some embodiments, the hydroxyapatite is nano-hydroxyapatite (n-HAP). In non-limiting examples, such aggregates have a mean diameter of less than 1000 nm, e.g., 1 to 1000 nm, 50 to 1000 nm, 10 nm to 100 nm, 100 nm to 1000 nm. In some embodiments, the hydroxyapatite may be a functionalized hydroxyapatite, e.g., HAP $CaCO_3$, $ZnCO_3$-hydroxyapatite, or HAP/TCP (tricalcium phosphate). In some embodiments, the hydroxyapatite is present in an amount of from 1% to 10% by weight of the composition. In some embodiments, the hydroxyapatite is present in an amount of from 2% to 10%, from 3% to 10%, from 4% to 10%, from 5% to 10%, from 4% to 9%, 5% to 9%, from 4% to 8%, from 5% to 8%, about 5%, or about 8%, by weight of the composition.

The oral care composition of the invention comprises hydroxyethylcellulose (HEC) as a thickening agent. Hydroxyethylcellulose is a non-ionic, water soluble polymer derived from cellulose. The degree of substitution of hydroxyethyl groups on a molar basis may be 1.5 to 3. In some embodiments, hydroxyethylcellulose is present in an amount of from 0.1% to 5% by weight of the composition. In some embodiments, hydroxyethylcellulose is present in an amount of from 1% to 5%, from 1% to 4%, from 2% to 5%, from 2% to 4%, from 3% to 5%, from 3.5% to 5%, from 4% to 5%, from 3.5% to 4.5%, or about 4%, by weight of the composition. In certain embodiments, the composition does not contain any thickening agent other than hydroxyethylcellulose.

In some embodiments, the oral care composition may contain additional thickening agents other than hydroxyethylcellulose. Suitable additional thickening agents may be any orally acceptable thickener or thickening agent configured to control the viscosity of the oral care composition. Illustrative thickeners may be or include, but are not limited to, colloidal silica, fumed silica, a cross-linked polyvinylpyrrolidone (PVP) polymer, cross-linked polyvinylpyrrolidone (PVP), or the like, or mixtures or combinations thereof. In some embodiments, the thickening system includes a cross-linked polyvinylpyrrolidone (PVP) polymer. The thickening system may also include POLYPLASDONE® XL 10F, which is commercially available from Ashland Inc. of Covington, KY. Illustrative thickeners may also be or include, but are not limited to, carbomers (e.g., carboxyvinyl polymers), carrageenans (e.g., Irish moss, carrageenan, iota-carrageenan, etc.), high molecular weight polyethylene glycols (e.g., CARBOWAX®, which is commercially available from The Dow Chemical Company of Midland, MI), cellulosic polymers, carboxymethylcellulose, and salts thereof (e.g., CMC sodium), natural gums (e.g., karaya, xanthan, gum arabic, and tragacanth), colloidal magnesium aluminum silicate, or the like, or mixtures or combinations thereof.

The oral care composition of the invention may comprise a basic amino acid in free or salt form. The basic amino acids which can be used in the compositions include not only naturally occurring basic amino acids, such as arginine, lysine, and histidine, but also any basic amino acids having a carboxyl group and an amino group in the molecule, which are water-soluble and provide an aqueous solution with a pH of about 7 or greater. Accordingly, basic amino acids include, but are not limited to, arginine, lysine, citrulline, ornithine, creatine, histidine, diaminobutyric acid, diaminopropionic acid, salts thereof or combinations thereof. In a particular embodiment, the basic amino acids are selected from arginine, lysine, citrulline, and ornithine. The basic amino acids of the oral care composition may generally be present in the L-form or L-configuration. The basic amino acids may be provided as a salt of a di- or tri-peptide including the amino acid. In some embodiments, at least a portion of the basic amino acid present in the oral care composition is in the salt form. In some embodiments, the basic amino acid is arginine, for example, L-arginine, or a salt thereof. Arginine may be provided as free arginine or a salt thereof. For example, Arginine may be provided as arginine phosphate, arginine hydrochloride, arginine sulfate, arginine bicarbonate, or the like, and mixtures or combinations thereof. The basic amino acid may be provided as a solution or a solid. For example, the basic amino acid may be provided as an aqueous solution. In some embodiments, the amino acid includes or is provided by an arginine bicarbonate solution. For example, the amino acid may be provided by an about 40% solution of the basic amino acid, such as arginine bicarbonate or alternatively called as arginine carbamate. In some embodiments, the basic amino acid is present in an amount of from 1% to 15%, e.g., from 1% to 10%, from 2% to 8%, from 3% to 7%, from 4% to 6%, or about 5% by weight of the composition, being calculated as free base form.

In another aspect, in addition to a basic amino acid included in the formulation, the compositions of the disclosure (e.g., any of Compositions 1.0 et seq or Method 2.0 et seq) can further include a neutral amino acid, which can include, but are not limited to, one or more neutral amino acids selected from the group consisting of alanine, aminobutyrate, asparagine, cysteine, cystine, glutamine, glycine, hydroxyproline, isoleucine, leucine, methionine, phenylalanine, proline, serine, taurine, threonine, tryptophan, tyrosine, valine, and combinations thereof.

In still another aspect, the compositions and methods of the disclosure (e.g., any of Compositions 1.0 et seq or Method 2.0 et seq) can include a neutral amino acid (e.g., either alone or in combination with a basic amino acid), which can include, but are not limited to, one or more neutral amino acids selected from the group consisting of alanine, aminobutyrate, asparagine, cysteine, cystine, glutamine, glycine, hydroxyproline, isoleucine, leucine, methionine, phenylalanine, proline, serine, taurine, threonine, tryptophan, tyrosine, valine, and combinations thereof.

The oral care composition of the invention may include fluoride, such as one or more fluoride ion sources (e.g., soluble fluoride salts). A wide variety of fluoride ion-yielding materials may be employed as sources of soluble fluoride. Illustrative fluoride ion sources include, but are not limited to, sodium fluoride, stannous fluoride, potassium fluoride, sodium monofluorophosphate, fluorosilicate salts, such as sodium fluorosilicate and ammonium fluorosilicate, amine fluoride, ammonium fluoride, and combinations thereof. In some embodiments, the fluoride ion source includes sodium fluoride. The amount of the fluoride ion source present in the oral care composition may be greater than 0 weight % and less than 0.8 wt. %, less than 0.7 wt. %, less than 0.6 wt. %, less than 0.5 wt. %, or less than 0.4 wt. %. The fluoride ion sources may be present in an amount sufficient to supply 25 ppm to 5,000 ppm of fluoride ions, generally at least 500 ppm, e.g., 500 to 2000 ppm, e.g., 1000 ppm to 1600 ppm, e.g., 1450 ppm.

The oral care composition of the invention may comprise a zinc ion source. The zinc ion source may be or include a zinc ion and/or one or more zinc salts. For example, the zinc salts may at least partially dissociate in an aqueous solution to produce zinc ions. Illustrative zinc salts may include, but are not limited to, zinc lactate, zinc oxide, zinc chloride, zinc phosphate, zinc citrate, zinc acetate, zinc borate, zinc butyrate, zinc carbonate, zinc formate, zinc gluconate, zinc glycerate, zinc glycolate, zinc picolinate, zinc propionate, zinc salicylate, zinc silicate, zinc stearate, zinc tartrate, zinc undecylenate, and mixtures thereof. In some embodiments, the zinc ion source is present in an amount of from 0.01% to 5%, e.g., 0.1% to 4%, or 1% to 3%, by weight of the composition.

In some embodiments, the zinc ion source is selected from zinc oxide, zinc citrate, and a combination thereof. Zinc oxide may be present in an amount of 0.5% to 2%, e.g., 0.5% to 1.5%, or about 1% by weight of the composition. Zinc citrate may be present in an amount of 0.1% to 1%, 0.25% to 0.75%, about 0.5% by weight of the composition by weight of the composition. In some embodiments, the composition comprises zinc oxide and zinc citrate. The composition may comprise zinc oxide in an amount of 0.5% to 2%, e.g., 0.5% to 1.5%, about 1% or about 1.2% by weight of the composition and zinc citrate in an amount of 0.1% to 1%, 0.25% to 0.75%, about 0.5% by weight of the composition. In certain embodiments, the composition comprises zinc oxide in an amount of about 1% by weight of the composition and zinc citrate in an amount of about 0.5% by weight of the composition.

The oral care composition of the invention may include a stannous ion source. The stannous ion source can be a soluble or an insoluble compound of stannous with inorganic or organic counter ions. Examples include the fluoride, chloride, chlorofluoride, acetate, hexafluorozirconate, sulfate, tartrate, gluconate, citrate, malate, glycinate, pyrophosphate, metaphosphate, oxalate, phosphate, carbonate salts and oxides of stannous. In some embodiments, the stannous ion source is selected from the group consisting of stannous chloride, stannous fluoride, stannous pyrophosphate, stannous formate, stannous acetate, stannous gluconate, stannous lactate, stannous tartrate, stannous oxalate, stannous malonate, stannous citrate, stannous ethylene glyoxide, and mixtures thereof.

In some embodiments, the oral care compositions may include one or more abrasives or an abrasive system including one or more abrasives. As used herein, the term "abrasive" may also refer to materials commonly referred to as "polishing agents". Any orally acceptable abrasive may be used, but preferably, type, fineness (particle size), and amount of the abrasive may be selected such that the tooth enamel is not excessively abraded in normal use of the oral care composition. The one or more abrasives may have a particle size or D50 of less than or equal to about 10 µm, less than or equal to about 8 µm, less than or equal to about 5 µm, or less than or equal to about 3 µm. The one or more abrasives may have a particle size or D50 of greater than or equal to about 0.01 µm, greater than or equal to about 0.05 µm, greater than or equal to about 0.1 µm, greater than or equal to about 0.5 µm, or greater than or equal to about 1 µm. Illustrative abrasives may include, but are not limited to, metaphosphate compounds, phosphate salts (e.g., insoluble phosphate salts), such as sodium metaphosphate, potassium metaphosphate, calcium pyrophosphate, magnesium orthophosphate, trimagnesium orthophosphate, tricalcium phosphate, dicalcium phosphate dihydrate, anhydrous dicalcium phosphate, calcium carbonate (e.g., precipitated calcium carbonate and/or natural calcium carbonate), magnesium carbonate, hydrated alumina, silica, zirconium silicate, aluminum silicate including calcined aluminum silicate, polymethyl methacrylate, or the like, or mixtures and combinations thereof. The amount or concentration of the abrasives present in the oral care composition may vary widely. In some embodiments, the amount of the abrasives present in the oral care composition may be from about 15 weight % to about 70 weight %, e.g., from about 20 weight % to about 50 weight %, from about 25 weight % to about 45 weight %, from about 30 weight % to about 40 weight %, or from about 10% to about 20 weight %, or about 15 weight %, based on a total weight of the oral care composition.

In some embodiments, the oral care composition comprises a silica abrasive. In some embodiments, the silica abrasive is present in an amount of from 10% to 30%, e.g., 10% to 20%, 15% to 25%, or about 15%, by weight of the composition. In some embodiments, the oral care composition comprises a calcium-free silica abrasive.

In some embodiments, the oral care composition of the invention comprises a calcium-containing abrasive (e.g., calcium carbonate). In some embodiments, the calcium-containing abrasive is selected from calcium carbonate, calcium phosphate (e.g., dicalcium phosphate dihydrate), calcium sulfate, and combinations thereof. In some embodiments, the oral care composition comprises calcium carbonate as an abrasive. In one embodiment, the oral care composition comprises precipitated calcium carbonate or natural calcium carbonate. Precipitated calcium carbonate may be preferred over natural calcium carbonate.

The oral care composition of the present invention may include at least one surfactant or solubilizer. Suitable surfactants include neutral surfactants (such as polyoxyethylene hydrogenated castor oil or fatty acids of sugars), anionic surfactants (such as sodium lauryl sulfate), cationic surfactants (such as the ammonium cation surfactants) or zwitterionic surfactants. These surfactants or solubilizers may be present in amounts of typically from 0.01% to 5%, from 0.01% to 2%; or from 1% to 2%; or about 1.5%, by weight of the composition. In some embodiments, the composition may comprise an anionic surfactant. Suitable anionic surfactants include without limitation water-soluble salts of $C_{8-20}$ alkyl sulfates, sulfonated monoglycerides of $C_{8-20}$ fatty acids, sarcosinates, taurates and the like. Illustrative examples of these and other classes include sodium lauryl sulfate, sodium lauryl ether sulfate, ammonium lauryl sulfate, ammonium lauryl ether sulfate, sodium cocoyl monoglyceride sulfonate, sodium lauryl sarcosinate, sodium lauryl isethionate, sodium laureth carboxylase, and sodium dodecyl benzenesulfonate. In some embodiments, the anionic surfactant, e.g., sodium lauryl sulfate (SLS), is present in an amount of from about 0.3% to about 4.5% by weight, e.g., 1-2% by weight of the composition. In some embodiments, the composition may comprise, zwitterionic surfactant, e.g., a betaine zwitterionic surfactant. The betaine zwitterionic surfactant may be a $C_8$-$C_{16}$ aminopropyl betaine, e.g., cocamidopropyl betaine. In some embodiments, the betaine zwitterionic surfactant, e.g., cocamidopropyl betaine, is present in an amount of from 1% to 1.5%, from 1.1% to 1.4%, from 1.2% to 1.3%, or about 1.25% by weight of the composition. In some embodiments, the composition may comprise a non-ionic surfactant, e.g., a non-ionic block copolymer. The non-ionic block copolymer may be a poly(propylene oxide)/poly(ethylene oxide) copolymer. In some embodiments, the copolymer has a polyoxypropylene molecular mass of from 3000 to 5000 g/mol and a polyoxyethylene content of from 60 to 80 mol %. In some embodiments, the non-ionic block copolymer is a poloxamer. In some embodiments, the non-ionic block copolymer is selected from: Poloxamer 338, Poloxamer 407, Poloxamer, 237, Poloxamer, 217, Poloxamer 124, Poloxamer 184, Poloxamer 185, and a combination of two or more thereof.

In some embodiments, the oral care composition of the invention may include one or more humectants. Humectants can reduce evaporation and also contribute towards preservation by lowering water activity and can also impart desirable sweetness or flavor to compositions. Illustrative humectants may be or include, but are not limited to, glycerin, propylene glycol, polyethylene glycol, sorbitol, xylitol, or the like, or any mixture or combination thereof. In a preferred embodiment, the orally acceptable vehicle may be or include, but is not limited to, glycerin or sorbitol. In some embodiments, the humectant is selected from glycerin, sorbitol and a combination thereof. In some embodiments, the humectant may be present in an amount of from 20% to 60%, for example from 15% to 40%, from 15% to 35%, from 20% to 40%, from 30% to 50%, from 30% to 40%, or from 40% to 45%, by weight of the composition. In some embodiments, the composition comprises glycerin, optionally wherein glycerin is present in an amount of from 15% to 40%, from 20% to 40%, from 30% to 40%, or about 35% by weight of the composition. In some embodiments, the composition comprises sorbitol, optionally wherein sorbitol is present in an amount of from 15% to 40%, from 20% to 40%, from 30% to 40%, or about 35% by weight of the composition.

The oral care composition of the present invention may include a preservative. Suitable preservatives include, but are not limited to, sodium benzoate, potassium sorbate, methylisothiazolinone, paraben preservatives, for example methyl p-hydroxybenzoate, propyl p-hydroxybenzoate, and mixtures thereof.

The oral care composition of the present invention may include a sweetener such as, for example, saccharin, for example sodium saccharin, acesulfam, neotame, cyclamate or sucralose; natural high-intensity sweeteners such as thaumatin, stevioside or glycyrrhizin; or such as sorbitol, xylitol, maltitol or mannitol. One or more of such sweeteners may be present in an amount of from 0.005% to 5% by weight, for example 0.01% to 1%, for example 0.01% to 0.5%, by weight of the composition.

The oral care composition of the present invention may include a flavoring agent. Suitable flavoring agents include, but are not limited to, essential oils and various flavoring aldehydes, esters, alcohols, and similar materials, as well as sweeteners such as sodium saccharin. Examples of the essential oils include oils of spearmint, peppermint, wintergreen, sassafras, clove, sage, eucalyptus, marjoram, cinnamon, lemon, lime, grapefruit, and orange. Also useful are such chemicals as menthol, carvone, and anethole. The flavoring agent is typically incorporated in the oral composition at a concentration of 0.01 to 3% by weight.

The oral care composition of the invention may include one or more pH modifying agents. For example, the oral care composition may include one or more acidifying agents and/or one or more basifying agents configured to reduce and/or increase the pH thereof, respectively. Illustrative acidifying agents and/or one or more basifying agents may be or include, but are not limited to, an alkali metal hydroxide, such as sodium hydroxide and/or potassium hydroxide, citric acid, hydrochloric acid, or the like, or combinations thereof.

The oral care composition of the invention may also include one or more buffering agents configured to control or modulate the pH within a predetermined or desired range. Illustrative buffering agents may include, but are not limited to, sodium bicarbonate, sodium phosphate, sodium carbonate, sodium acid pyrophosphate, sodium citrate, and mixtures thereof. Sodium phosphate may include monosodium phosphate ($NaH_2PO_4$), disodium phosphate ($Na_2HPO_4$), trisodium phosphate ($Na_3PO_4$), and mixtures thereof. In a typical embodiment, the buffering agent may be anhydrous sodium phosphate dibasic or disodium phosphate and/or sodium phosphate monobasic. In another embodiment, the buffering agent includes anhydrous sodium phosphate dibasic or disodium phosphate, and phosphoric acid (e.g., syrupy phosphoric acid; 85%-Food Grade).

The oral care composition of the invention may include anticalculus agents. Illustrative anticalculus agents may include, but are not limited to, phosphates and polyphosphates (e.g., pyrophosphates), polyaminopropanesulfonic acid (AMPS), hexametaphosphate salts, zinc citrate trihydrate, polypeptides, polyolefin sulfonates, polyolefin phosphates, diphosphonates. In some embodiments, the anticalculus agent includes tetrasodium pyrophosphate (TSPP), sodium tripolyphosphate (STPP), or a combination thereof.

The oral care composition of the invention may include an antioxidant. Any orally acceptable antioxidant may be used, including, but not limited to, butylated hydroxyanisole (BHA), butylated hydroxytoluene (BHT), vitamin A, carotenoids, vitamin E, flavonoids, polyphenols, ascorbic acid, herbal antioxidants, chlorophyll, melatonin, or the like, or combinations and mixtures thereof.

The oral care composition of the invention may include one or more pigments, such as whitening pigments. In some embodiments, the whitening pigments include particles ranging in size from about 0.1 µm to about 10 µm with a refractive index greater than about 1.2. Suitable whitening agents include, without limitation, titanium dioxide particles, zinc oxide particles, aluminum oxide particles, tin oxide particles, calcium oxide particles, magnesium oxide particles, barium oxide particles, silica particles, zirconium silicate particles, mica particles, talc particles, tetracalcium phosphate particles, amorphous calcium phosphate particles, alpha-tricalcium phosphate particles, beta-tricalcium phosphate particles, hydroxyapatite particles, calcium carbonate particles, zinc phosphate particles, silicon dioxide particles, zirconium silicate particles, or the like, or mixtures and combinations thereof. The whitening pigment, such as titanium dioxide particles, may be present in an amount that is sufficient to whiten the teeth.

All ingredients for use in the compositions described herein should be orally acceptable. As used herein, "orally acceptable" may refer to any ingredient that is present in a composition as described in an amount and form which does not render the composition unsafe for use in the oral cavity.

In another aspect, the invention provides the use of hydroxyapatite (HAP) and hydroxyethylcellulose (HEC) for the making of an oral care composition, e.g., any of oral care compositions disclosed herein, e.g., any of Compositions 1 et seq. for inhibiting enamel erosion, repairing enamel erosion damage, and/or increasing enamel microcrack and/or microscratch resistance.

EXAMPLES

Example 1

Thickeners are widely used in formulation for structure building purposes. In the process of developing a paint on gel for enamel erosion benefits, we examine the enamel repair potential of four common thickeners (hydroxyethylcellulose (HEC), xanthan gum, chitosan and carbopol). Proper amounts of each polymer are added to deionized (DI) water to make a simple gel. Each of the simple gels are then tested to evaluate the polymer's impact on enamel repair. Due to the unique properties of thickeners, the same level of concentration yields a significant viscosity difference. In a gel containing exclusively thickeners and water, the gel structure is built based solely on each of the thickeners. This gel should be able to flow through paint-on pen applicators or pumps. Hence all the gel prototypes tested in this experiment have significantly lower viscosity than toothpaste (around 200K cP depending on formulas). 4% HEC, 1% carbopol, 1.6% xanthan gum are selected after considering flowability, viscosity and cosmetic evaluation of the gel. 1% and 2% HEC are selected for a dosage response study of HEC gel. 1% chitosan gel is selected due to the fact that chitosan crashes out as pH rises to 6.5 (utilization of a higher percentage of chitosan would require a lower pH which was not ideal for this comparison). The cold gel processing steps are performed to create 200 g of each gel formula. 8 g HEC, 2 g HEC, 4 g HEC, 2 g Chitosan, 2 g Carbopol or 3.2 g Xanthan is slowly added to room temperature to 200 ml of deionized water under an overhead mixer to yield gels at the desired concentrations. Each gel is mixed for 20 minutes until dissolved. Gels are then transferred to a speed mixer and centrifuged for 5 minutes at 2200 rpm. The pH of each gel is adjusted to 6.5 with NaOH solution. The viscosity of each gel is then measured using a viscometer. The viscosity of tested simple gels is shown in Table 1.

TABLE 1

Viscosity of tested simple gels.

| Gel Formulas/Treatments | Viscosity |
| --- | --- |
| 4% HEC | 4528.19 cP |
| 1% HEC | 337.184 cP |
| 2% HEC | 468.361 cP |
| 1% Chitosan | 101.08 cP |
| 1% Carbopol | 12135.5 cP |
| 1.6% Xanthan | 15756.00 cP |
| Deionized Water | n/a |

Polished bovine enamel blocks are dried overnight and baseline surface hardness (Sound Hardness) is measured for each block. Only blocks with Knoops Hardness larger than 300 are selected (KHN>300, 50 g force) for the in vitro study. Each block is submerged into 2 ml of demineralization solution (1% citric acid pH adjusted to 3.5 with NaOH) for 10 minutes in 24 well plate and then rinsed twice with 8 ml of deionized (DI) water using 6 well plates at 300 rpm shaking for 2 minutes, and allowed to dry overnight. The surface hardness post-acid challenge (Etched Hardness) is measured again. Only blocks with 40% to 70% hardness lost are selected. A total of 35 selected blocks are prepared, randomized and grouped into the 6 treatments (n=5). Each group of blocks are then submerged into 2 ml of the tested gel solution (pH adjusted to 6.5 with NaOH) for 5 minutes at 100 rpm shaking and then rinsed twice with 8 ml of DI water (per block) using a 6 well plates at 300 rpm shaking for 2 minutes. Blocks are submerged into remineralization solution (0.2205 g/L $CaCl_2 \cdot 2H_2O$, 0.1225 g/L $KH_2PO_4$, 9.6915 g/L KCl and 4.766 g/L HEPEs buffer, pH adjusted to 7 with NaOH) for 4 hours. The gel treatment and rinse steps as above are repeated. After rinsing with water, blocks are then submerged into remineralization solution overnight (>16 hrs). Next day, each block is rinsed once with 8 ml of DI water using a 6 well plate at 300 rpm shaking for 2 minutes. Blocks are allowed to dry overnight and final surface hardness (Final Hardness) is measured. % hardness repair is calculated according to the below equation:

$$\% \text{ Hardness Repair} = \frac{\text{Final Hardness} - \text{Etched Hardness}}{\text{Sound Hardness} - \text{Etched Hardness}} \times 100\%$$

One way ANOVA method is applied for statistical analysis. The % hardness repair of the tested gels is categorized into A, B, C and D using the Tukey method and 95% confidence. The result is shown in Table 2.

TABLE 2

Hardness repair of simple gels

| Treatment | N | Mean % hardness repair | Standard deviation | Grouping* | | | |
| --- | --- | --- | --- | --- | --- | --- | --- |
| 4% HEC | 5 | 50.65 | 3.20 | A | | | |
| 1% Chitosan | 5 | 31.62 | 2.71 | | B | | |
| 1% Carbopol | 5 | 24.5 | 2.55 | | | C | |
| 1.6% Xanthan | 5 | 22.03 | 1.70 | | | C | |
| Water | 5 | 16.70 | 1.62 | | | | D |

*Means that do not share a letter are significantly different.

As shown in Table 2, all tested simple gels repair acid damaged enamel significantly better than the water control. Among the tested gels, 4% HEC gel shows the best performance, followed by 1% chitosan. This result shows that not all the thickeners have the same impact on repairing erosive damaged enamel. HEC shows superior effect compared to xanthan gum, chitosan and carbopol.

Next, dosing effects exhibited by HEC on repairing erosive damaged enamel is examined. Three doses (1, 2 and 4%) of HEC are tested for enamel repair efficacy. One way ANOVA method is applied for statistical analysis. The % hardness repair of the tested gels is categorized into A, B, and C using the Tukey method and 95% confidence. The result is shown in Table 3. The result shows a dosing effect on enamel repair efficacy. 4% HEC gel shows superior efficacy compared to 1% and 2%. This result shows that a 4% HEC gel base provides substantial enamel repair benefit.

TABLE 3

Hardness repair of simple HEC gels

| Treatment | N | Mean % hardness repair | Standard deviation | Grouping* | | |
| --- | --- | --- | --- | --- | --- | --- |
| 4% HEC | 5 | 50.65 | 3.20 | A | | |
| 1% HEC | 5 | 38.73 | 0.89 | | B | |
| 2% HEC | 5 | 38.65 | 1.15 | | B | |
| Water | 5 | 16.70 | 1.62 | | | C |

*Means that do not share a letter are significantly different.

Example 2

The enamel protection and repair efficacy of HEC-based gel containing Hydroxyapatite (HAP) are examined. 5% or 8% micro-HAP (HAP $CaCO_3$) is incorporated into 4% HEC gel base. The list of tested simple gels is shown in Table 4.

TABLE 4

| Name | Thickener | HAP | Water |
| --- | --- | --- | --- |
| Water | n/a | n/a | 100% |
| HEC control | 4% HEC | n/a | 96% |

TABLE 4-continued

| Name | Thickener | HAP | Water |
|---|---|---|---|
| HEC + 5% HAP | 4% HEC | 5% HAP | 91% |
| HEC + 8% HAP | 4% HEC | 8% HAP | 88% |

The enamel repair efficacy of the gels is determined as described in Example 1. One way ANOVA method is applied for statistical analysis. The % hardness loss of the tested gels is categorized into A and B using the Tukey method and 95% confidence. The result is shown in Table 5.

TABLE 5

| Treated sample | N | Mean % hardness repair | Standard deviation | Grouping* |
|---|---|---|---|---|
| Water | 5 | 18.23 | 2.80 | A |
| HEC gel | 5 | 52.54 | 2.89 | B |
| HEC + 5% HAP gel | 5 | 52.07 | 3.89 | B |
| HEC + 8% HAP gel | 5 | 52.01 | 2.98 | B |

*Means that do not share a letter are significantly different.

4% HEC gel shows a high repair percentage (52.54%). The addition of 5% and 8% HAP, however, does not have a significant impact on enamel repair efficacy. Nevertheless, all gels enable significant recovery of microhardness compared to water.

Next, the enamel protection efficacy is determined as follows.

1. Polished bovine enamel blocks are dried overnight and baseline surface hardness (Sound hardness) is measured for each block. Only blocks with Knoops Hardness larger than 300 are selected (KHN>300, 50 g force) for the in vitro study.
2. Blocks are hydrated by submerging them into remineralization (remin) solution (0.2205 g/L $CaCl_2 \cdot 2H_2O$, 0.1225 g/L $KH_2PO_4$, 9.6915 g/L KCl and 4.766 g/L HEPEs buffer, pH 7) over the weekend.
3. On the following Monday, each block is rinsed twice with 8 ml of deionized (DI) water using 6 well plates at 300 rpm shaking for 2 minutes.
4. Each group of blocks are then submerged into 2 ml of respective gel solution (pH adjusted to 6.5 with NaOH) for 5 minutes.
5. Enamel blocks are rinsed twice with 8 ml of DI water (per block) using a 6 well plates at 300 rpm shaking for 2 minutes.
6. Enamel blocks are transferred into 8 ml of 1% citric acid (pH adjusted to 3.5 with NaOH) for 2 minutes.
7. Enamel blocks are rinsed twice with 8 ml of DI water (per block) using a 6 well plates at 300 rpm shaking for 2 minutes.
8. Each enamel block is then transferred into an 8 ml remin solution for an hour.
9. Repeat step 6 & 7 three times.
10. Repeat gel treatment step 4 & 5.
11. All blocks are transferred into remin solution (8 ml in each well). Incubate at 37° C. overnight.
12. For Tuesday to Thursday, repeat steps 3 to 10.
13. On Friday, blocks are taken out of remin solution and washed twice. Blocks are then transferred to a new plate and allowed to dry over the weekend before measurement of final surface hardness (Post Challenges Hardness).
14. % Hardness loss (demineralization) is calculated according to the below equation:

$$\% \text{ Hardness Loss} = \frac{\text{Sound Hardness} - \text{Post } Challanges \text{ Hardness}}{\text{Sound Hardness}} \times 100\%$$

One way ANOVA method is applied for statistical analysis. The % hardness loss of the tested gels is categorized into A, B and C using the Tukey method and 95% confidence. The result is shown in Table 6.

TABLE 6

| Treated sample | N | Mean % hardness loss | Standard deviation | Grouping* |
|---|---|---|---|---|
| Water | 5 | 63.14 | 3.91 | A |
| HEC gel | 5 | 58.32 | 3.85 | A |
| HEC + 5% HAP gel | 5 | 48.83 | 3.47 | B |
| HEC + 8% HAP gel | 5 | 36.45 | 6.46 | B |

*Means that do not share a letter are significantly different.

After the 16× acid challenge cycles, severe softening is observed for the water control (63.14% demineralization). The 4% HEC gel alone is not able to protect enamel from softening which shows similar demineralization (58.32%) compared to water, showing that HEC itself cannot withstand rigorous acid challenges. However, in the presence of 5% HAP, the gel reduces demineralization by 9.49%. 5% HAP gel is statistically better than HEC gel control. Positive dosage response is observed for 5% and 8% HAP gel (48.83% vs 36.45%). Confocal imaging is performed for representative enamel blocks per group. No surface deposition on water and HEC gel control samples is observed. However, the 5% HEC gel shows some isolated deposition and 8% HEC gel shows greater amounts of deposition. These results show that the incorporation of HAP to the HEC gel base significantly improves the acid protection properties of the gel.

Example 3

The enamel microcrack resistance efficacy of HEC-based gel containing HAP is determined using an in vitro enamel microcrack resistance model. The in vitro enamel resistance model is performed as follows. Bovine or human enamel is used in this model. Bovine enamel blocks are obtained from sound bovine incisors without defects. The labial surface of bovine teeth is cut to get enamel specimens (~3×3×2 mm) in which the enamel layer is ~1 mm thick and the dentin left in the specimen is ~1 mm thick. Human enamel blocks are obtained by removing the root portion of the molar and cutting the crown of the molar longitudinally into slices 2 mm thick using a water-cooled low-speed diamond saw. The enamel samples are mounted in the acrylic resin following the manufacturer's instructions. The embedded samples are grinded and polished with a sequential series of wet 400-4000 grit silicon carbide papers and nylon adhesive back discs with 0.25 µm diamond or colloidal silica suspension. The polished slices are rinsed thoroughly with distilled water (DDW) three times, sonicated in a water bath for 5 min, rinsed again, and allowed to air-dry.

The baseline microcracks (crack-1) are generated on the enamel specimen. Microindentation is performed using a micro-hardness tester with a Vickers diamond indenter at different loads (300 g, 500 g, and 1000 g). At least 5 indents are made on each specimen. Typically, the indentation of enamel results in the development of Palmqvist cracks at each of the indentation corners. The average crack length, fracture toughness, and brittleness for each sample are calculated.

The Vickers hardness (HV) for each indentation is calculated according to $$HV = \frac{0.1891F}{L^2}$$

where F is the indentation load and L the indentation diagonal.

The fracture toughness ($K_c$) is calculated as $$Kc = 0.0084\left(\frac{E}{HV}\right)^{\frac{2}{5}}\left(\frac{2F}{L}\right)\frac{1}{c^{\frac{1}{2}}}$$

where E, HV, F, L and c are the elastic modulus, Vickers hardness, indentation load, average indentation diagonal length and crack length, respectively.

The elastic modulus (E) is measured by using a Nanoindentation with Berkovich diamond indenter. The length of the 4 radial cracks for each indent is measured using a microscopy. The crack length is measured from the tip of the indentation diagonal to the end of the crack tip. The indentation brittleness (B) of enamel is calculated as $$B = \frac{HV \times E}{K^2}.$$

The enamel samples are treated with tested formulations/products. Treatment process varies based on the products. The treatment with toothpaste involves a 2 min application of diluted toothpaste slurry twice a day for 5 days. For the treatment with gel, the samples are treated with gel for 10 minutes once a day for 5 days. During the treatment period, samples are kept in the remineralization solution at 37° C. After the treatment, the samples are rinsed thoroughly using deionized water. The post-treatment microcracks (crack-2) are generated on the enamel specimen and the average crack length, fracture toughness, and brittleness for each sample are calculated following the methods described above. Statistical analysis between testing samples and controls is conducted to evaluate the efficacy of products/formulations in crack resistance.

The enamel microcrack resistance efficacy of a toothpaste containing 0.24% sodium fluoride and a gel containing HAP and HEC is examined by the in vitro enamel microcrack resistance model. 5% micro-HAP (HAP CaCO$_3$) is incorporated into 4% HEC gel base. Water is used as a negative control. The NaF toothpaste tested in this experiment is a commercial product believed to be able to remineralize tooth enamel. In this experiment, four human enamel blocks are used for each formulation. The results are shown in Table 7.

TABLE 7

|  | water | 0.24% NaF toothpaste | 4% HEC + 5% HAP gel |
|---|---|---|---|
| Change in crack length (μm) | 0.87 ± 1.98 | 1.34 ± 4.51 | −14.94 ± 2.53 |
| Change in fracture toughness ($K_c$) (MPa · m$^{0.5}$) | −0.02 ± 0.03 | −0.04 ± 0.07 | 0.23 ± 0.09 |

TABLE 7-continued

|  | water | 0.24% NaF toothpaste | 4% HEC + 5% HAP gel |
|---|---|---|---|
| Change in brittleness (B) (m$^{-1}$) | 1.17 ± 22.89 | −18.12 ± 67.55 | −100.47 ± 46.74 |

As shown in Table 7, there are no obvious changes in crack length, fracture toughness and brittleness with the samples treated with 0.24% sodium fluoride toothpaste. This shows that the NaF toothpaste believed to be able to remineralize tooth enamel does not perform well in increasing the microcrack resistance of the enamel. In contrast, the length of microcracks after treatment with 4% HEC+5% HAP gel is significantly shorter than the ones before treatments. A uniform layer of deposition is found on the samples surface treated with 4% HEC+5% HAP gel. In addition, the increase of fracture toughness and decrease of brittleness are also observed in the samples treated with 4% HEC+5% HAP gel. These results show that the treatment with the HAP gel increases the microcrack resistance of the enamel.

Example 4—Enamel Microscratch Resistance Model

The present formulations are tested in a microscratch model to evaluate their efficacy in resisting microscratch, according to the following procedure.

Enamel Sample Preparation
  a. Human molar without any restored caries is sectioned longitudinally into two pieces using a water-cooled low-speed diamond saw. After sectioning, the samples are mounted in the acrylic resin with the exposed occlusal surface. The embedded samples are grinded and polished with a sequential series of wet 400-4000 grit silicon carbide papers and nylon adhesive back discs with 0.25 μm diamond or colloidal silica suspension. The polished slices are rinsed thoroughly with distilled water three times, sonicated in a water bath for 5 min, rinsed again, and allowed to air-dry.
  b. Microscratch generation
  Nanoindentation with a Berkovich diamond tip indenter is used to generate a baseline ("scratch-I") microscratch on the enamel surfaces. In order to generate microscratch with sizes close to natural scratch, the normal force is maintained at 10 mN during the scratching. At least 5 indents are made at each specimen.
  c. The image for baseline microscratches are recorded using a microscope.
  d. The width, depth and volume are measured for the baseline microscratches.
  e. The average scratch width, depth, and volume are calculated for each sample.
Treatment
  f. The formulation/products are applied on the enamel samples. Treatment process varies based on the products. For example, the treatment with toothpaste involved a 2 min application of diluted toothpaste slurry twice a day. For the treatment with Gel type applications, the samples are treated with gel for 10 minutes once a day.
  g. The treated samples are rinsed with deionized water and then kept in the remineralized solution at 37° C. for 1 hour.

Acid Challenges
- h. The samples are removed from the remineralization solution and rinsed with deionized water.
- i. The samples are then soaked in 1% citric acid (pH adjusted to 3.6) solution for 2 minutes.
- j. The treated samples are then rinsed with deionized water and then kept in the remineralized solution at 37° C. for 1 hour.
- k. The acid challenge steps h-j are repeated three times. If a toothpaste is used for the experiment, the treatment is applied again after 4 times of acid challenges.
- l. The samples are kept in the remineralization solution at 37° C. overnight.
- m. The daily treatment and acid challenges (steps f-l) are repeated for 5 days.

Post Treatment
- n. The samples are rinsed thoroughly using deionized water.
- o. Post-treatment microscratches (scratch-2) are generated on the enamel specimens following the method described in step b above.
- p. The images for post-treatment microscratches are recorded using a microscope.
- q. The width, depth and volume for the post-treatment microsratched are measured.
- r. The average scratch width, depth, and volume are calculated for each sample.
- s. The changes in average width, depth, and volume are calculated or each treated sample.
- t. The statistical analysis are conducted between testing samples and controls to evaluate the efficacy of products/formulations in microscratch resistance.

Results:
The following toothpastes and gels are tested:

Measurements and Calculations

The images of microscratch are recorded before and after treatment procedure and analyzed according to the procedure above. The scratch sizes (width, depth and volume) are measured using a Keyence laser scanning microscope. The changes in size are calculated according to the following equations:

$$\Delta \text{Volume} = \text{Volume}_{post\text{-}treatment} - \text{Volume}_{baseline}$$

$$\Delta \text{Width} = \text{Width}_{post\text{-}treatment} - \text{Width}_{baseline}$$

$$\Delta \text{Depth} = \text{Depth}_{post\text{-}treatment} - \text{Depth}_{baseline}$$

Smaller values in $\Delta$Volume, $\Delta$Width and $\Delta$Depth indicate a better performance in resisting microscratch.

Results for Toothpastes

Two commercially available products (Commercial Toothpaste I and Commercial Toothpaste II) and three test toothpaste formulations are tested in the micro scratch resistant model as shown in Table 10. Commercial Toothpaste I and Commercial Toothpaste II are claimed to resist enamel microdamage.

The post-treatment microscratch with the Commercial Toothpaste I-treated sample is much deeper than the other microscratches with the samples treated with other toothpastes. For the samples treated with Commercial Toothpaste II and Arginine toothpastes, the post treatment scratches are less deep than the one observed in the Commercial Toothpaste I group. In contrast, it is clearly observed that the microscratches are significantly shallower when the samples are treated with HAP-containing toothpastes. Similar trends could be found when comparing the changes in microscratch sizes. The changes in scratch volumes after different toothpaste treatments are shown in Table 10, where a larger change in volume indicates a larger enamel loss:

TABLE 9

Formulations for microscratch analysis:

| Forms | Toothpaste | | | | | Gel | |
|---|---|---|---|---|---|---|---|
| Names | Commercial Toothpaste I | Commercial Toothpaste II | HAP Toothpaste | Arginine Toothpaste | Arginine + HAP Toothpaste | HEC Gel | HEC + HAP Gel |
| Active ingredient | Glycine (0.5%) | Zinc Hydroxyapatite (15%) | HAP + CaCO3 (HAP 5%) | Arginine | Arginine + HAP +. CaCO3 (HAP 8%) | — | HAP + CaCO3 (HAP 5% or 8%) |
| Other ingredients | calcium carbonate, glycerol, water, sodium lauryl sulfate, carboxymethyl cellulose, sodium saccharin, spearmint oil | Aqua, Hydrated Silica, Sorbitol, Glycerin, Silica, Aroma, Cellulose Gum, Xylitol, Zinc PCA, Sodium Myristoyl Sarcosinate, Sodium Methyl Cocoyl Taurate, Tetrapotassium Pyrophosphate, Sodium Saccharin, Zinc Citrate, Citric Acid, Ammonium Acryloyldimethyltaurate/VP Copolymer, Benzyl Alcohol, Phenoxyethanol, Sodium Benzoate, Limonene. | Water, Cocamidopropyl Betaine, Glycerin, Polyethylene Glycol, Sodium Carboxymethylcellulose, Sodium Lauryl Sulfate, Sodium Saccharin, Sorbitol, Silica, Xanthan Gum | Water, Carbon dioxide, Limestone, Sodium bicarbonate, Sodium saccharin, Sorbitol, Xanthan gum, Synthetic thickening silica | | | Water, Hydroxyethyl cellulose |

TABLE 10

Changes in scratch volume after toothpaste treatments

| | Water | Commercial Toothpaste I | Commercial Toothpaste II | HAP 5% | Arginine | Arginine + HAP 8% |
|---|---|---|---|---|---|---|
| Changes in volume ($\mu m^3$) | 57.63 | 64.86 | 40.24 | 26.06 | 37.63 | 18.57 |
| Group | A | A | AB | C | B | C |

Note:
different group letters indicate significant differences between the groups ($P < 0.05$).

The changes in microscratch widths after different toothpaste treatments are shown in Table 11, where a larger change in width indicates a larger enamel loss:

TABLE 11

Changes in microscratch width after toothpaste treatments

| | Water | Commercial Toothpaste I | Commercial Toothpaste II | HAP 5% | Arginine | Arginine + HAP 8% |
|---|---|---|---|---|---|---|
| Changes in Width ($\mu m$) | 1.13 | 1.41 | 0.65 | 0.37 | 0.85 | 0.36 |
| Group | A | B | C | D | AC | D |

Note:
different group letters indicate significant differences between the groups ($P < 0.05$).

The changes in microscratch depths after different toothpaste treatments are shown in Table 12, where a larger change in depth indicates a larger enamel loss:

TABLE 12

Changes in microscratch depth after toothpaste treatments

| | Water | Commercial Toothpaste I | Commercial Toothpaste II | HAP 5% | Arginine | Arginine + HAP 8% |
|---|---|---|---|---|---|---|
| Changes in Depth ($\mu m$) | 0.17 | 0.17 | 0.13 | 0.06 | 0.11 | 0.07 |
| Group | A | AB | B | C | D | C |

Note:
different group letters indicate significant differences between the groups ($P < 0.05$).

For the samples treated with HAP toothpaste, the size changes (volume, width and depth) are significantly smaller than the samples treated with other toothpaste. The results indicate that the HAP toothpaste has shown a better performance in improving the microscratch resistance than other toothpastes.

Results for Gels

The leave-on gels with 5% and 8% HAP are also tested with the microscratch resistance model. The changes in scratch volumes after different treatments are shown in Table 13, where a larger change in volume indicates a larger enamel loss:

TABLE 13

Changes in scratch volume after gel treatments

| | Water | HEC | 5% HAP | 8% HAP |
|---|---|---|---|---|
| Changes in volume ($\mu m^3$) | 60.85 | 42.99 | 18.06 | 9.46 |
| Group | A | B | C | D |

Note:
different group letters indicate significant differences between the groups ($P < 0.05$).

The changes in microscratch widths after different gel treatments are shown in Table 14, where a larger change in width indicates a larger enamel loss:

TABLE 14

Changes in microscratch width after gel treatments

| | Water | HEC | 5% HAP | 8% HAP |
|---|---|---|---|---|
| Changes in width ($\mu m$) | 1.32 | 0.69 | 0.24 | 0.24 |
| Group | A | A | B | B |

Note:
different group letters indicate significant differences between the groups ($P < 0.05$).

The changes in microscratch depths after different gel treatments are shown in Table 15, where a larger change in width indicates a larger enamel loss:

TABLE 15

Changes in microscratch depth after gel treatments

| | Water | HEC | 5% HAP | 8% HAP |
|---|---|---|---|---|
| Changes in volume ($\mu m^3$) | 0.13 | 0.1 | 0.08 | 0.04 |
| Group | A | AB | B | C |

Note:
different group letters indicate significant differences between the groups ($P < 0.05$).

Compared to the control group (HEC gel), only shallow microscratches are observable for the samples treated with HAP gels, and their scratch-size changes (volume, width and depth) are significantly smaller than the samples treated with gel without HAP. Furthermore, a smaller microscratch is observed when the HAP concentration is increased from 5% to 8%. The results indicate that the HAP with the gel form is effective in resisting the microscratch on the enamel surface.

In order to compare the performance in microscratch resistance among the tested toothpaste and gels, the changes in microscratch sizes (width and depth) from different tests are mapped out. The results clearly demonstrated that the HAP technology has a great potential in resisting the microscratch on the enamel surface.

The data from the microscratch resistance model demonstrates that the HAP formulations described herein have a great potential in resisting microscratches on the enamel surface.

While the disclosure has been described with respect to specific examples including presently preferred modes of carrying out the disclosure, those skilled in the art will appreciate that there are numerous variations and permutations of the systems and techniques described above. It is to be understood that other embodiments may be utilized and structural and functional modifications may be made without departing from the scope of the present disclosure. Thus, the scope of the disclosure should be construed broadly as set forth in the appended claims.

What is claimed is:

1. An oral care composition comprising from about 1% to 10% of hydroxyapatite by weight of the composition and from about 0.1% to 5% hydroxyethylcellulose by weight of the composition, wherein the hydroxyapatite (HAP) is selected from the group consisting of a micro-hydroxyapatite (m-HAP) and a nano-hydroxyapatite (n-HAP)), wherein mean diameter of the m-HAP ranges from about 1 to about 100 µm, wherein the composition increases enamel microscratch resistance, wherein the composition when applied to an enamel sample in a treatment and acid challenge regimen, provides at least a 50% reduction in a change in microscratch volume as compared to an identical composition that is free from the m-HAP or n-HAP.

2. The oral care composition of claim 1, wherein the composition comprises a fluoride ion source.

3. The oral care composition of claim 1, wherein the composition comprises a basic amino acid.

4. The oral care composition of claim 1, wherein the composition comprises a zinc ion source.

5. The oral care composition of claim 1, wherein the composition comprises a potassium ion source.

6. The oral care composition of claim 1, wherein the composition comprises an abrasive.

7. The oral care composition of claim 1, wherein the composition comprises a humectant.

8. The oral care composition of claim 1, wherein the composition comprises hydroxyapatite (HAP) in an amount of from 5% to 8% by weight of the composition and hydroxyethylcellulose (HEC) in an amount of from 3.5% to 4.5% by weight of the composition.

9. The oral care composition of claim 1, wherein the composition is a toothpaste, gel, serum, mouth spray, or mouthwash.

10. A method of reducing or inhibiting enamel erosion, repairing enamel erosion damage, increasing enamel microcrack resistance and/or increasing enamel microscratch resistance, comprising applying an oral care composition comprising from about 1% to 10% of hydroxyapatite by weight of the composition and from about 0.1% to 5% hydroxyethylcellulose by weight of the composition to the oral cavity, wherein the hydroxyapatite (HAP) is selected from the group consisting of a micro-hydroxyapatite (m-HAP) and a nano-hydroxyapatite (n-HAP)), wherein mean diameter of the m-HAP ranges from about 1 to about 100 µm, wherein the composition when applied to an enamel sample in a treatment and acid challenge regimen, provides at least a 50% reduction in a change in microscratch volume as compared to an identical composition that is free from the m-HAP or n-HAP.

11. The method of increasing enamel microcrack resistance and/or increasing enamel microscratch resistance according to claim 10, comprising applying an oral care composition comprising hydroxyapatite and hydroxyethylcellulose to the oral cavity.

12. The method of claim 11, wherein the oral care composition is applied to the oral cavity of a subject who is at risk of enamel microcracks or has enamel microcracks.

13. The method of claim 11, wherein the oral care composition is applied to the oral cavity of a subject who is at risk of enamel microscratches or has enamel microscratches.

14. The oral care composition of claim 1, wherein the hydroxyapatite is a functionalized HAP and wherein the functionalized HAP is HAP $CaCO_3$.

15. The method of claim 10, wherein the hydroxyapatite is a functionalized HAP and wherein the functionalized HAP is HAP $CaCO_3$.

* * * * *